US012687117B2

(12) United States Patent
Hillier

(10) Patent No.: US 12,687,117 B2
(45) Date of Patent: Jul. 21, 2026

(54) INTERCOMPONENT SEAL ARRANGEMENT FOR A GAS TURBINE ENGINE

(71) Applicant: Rolls-Royce plc, London (GB)

(72) Inventor: Steven Hillier, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 18/960,222

(22) Filed: Nov. 26, 2024

(65) Prior Publication Data

US 2025/0250906 A1 Aug. 7, 2025

(30) Foreign Application Priority Data

Dec. 18, 2023 (GB) ..................................... 2319381

(51) Int. Cl.
*F01D 11/00* (2006.01)

(52) U.S. Cl.
CPC ............ *F01D 11/005* (2013.01); *F01D 11/00* (2013.01); *F05D 2240/55* (2013.01)

(58) Field of Classification Search
CPC .... F01D 11/00; F01D 11/005; F05D 2240/55; F05D 2240/57; F05D 2250/11
See application file for complete search history.

(56) References Cited

U.S. PATENT DOCUMENTS

| | | | | |
|---|---|---|---|---|
| 5,156,528 | A | 10/1992 | Bobo | |
| 11,073,038 | B2 | 7/2021 | Blaney et al. | |
| 2002/0121747 | A1* | 9/2002 | Kolodziej | F16J 15/0887 277/644 |
| 2011/0179798 | A1* | 7/2011 | Pieussergues | F02C 7/28 277/650 |
| 2012/0274034 | A1 | 11/2012 | Bouchard et al. | |
| 2016/0319686 | A1 | 11/2016 | Shi et al. | |
| 2016/0319687 | A1* | 11/2016 | Thomas | F01D 11/08 |
| 2017/0254271 | A1* | 9/2017 | Hillier | F02C 7/28 |
| 2018/0149030 | A1 | 5/2018 | Freeman et al. | |
| 2018/0171817 | A1* | 6/2018 | De Luca | F04D 27/0215 |
| 2020/0355089 | A1 | 11/2020 | Razzell et al. | |

FOREIGN PATENT DOCUMENTS

EP 3088680 A1 11/2016

OTHER PUBLICATIONS

European search report dated May 2, 2025, issued in EP Patent Application No. 24213485.6.
Great Britain search report dated May 22, 2024, issued in GB Patent Application No. 2319381.6.

* cited by examiner

*Primary Examiner* — Elton K Wong

(57) ABSTRACT

An intercomponent seal arrangement includes a plurality of wall segments extending circumferentially. Adjacent wall segments from the plurality of wall segments include opposing first and second end wall portions defining a gap therebetween. The gap includes a saddle portion facing radially outwards and including a first sealing face on the first end wall portion and a second sealing face on the second end wall portion. The intercomponent seal arrangement further includes an intercomponent seal located within the saddle portion and including at least a first contact point contacting the first sealing face, a second contact point contacting the second sealing face, and a third contact point radially inwards from the first and second contact points and contacting one of the first and second sealing faces.

14 Claims, 6 Drawing Sheets

INTERCOMPONENT SEAL ARRANGEMENT FOR A GAS TURBINE ENGINE

CROSS-REFERENCE TO RELATED APPLICATIONS

This specification is based upon and claims the benefit of priority from United Kingdom patent application number GB 2319381.6 filed on Dec. 18, 2023, the entire contents of which is incorporated herein by reference.

BACKGROUND

Technical Field

This disclosure relates to an intercomponent seal arrangement for a gas turbine engine.

Description of the Related Art

Components in a gas turbine engine, such as seal segments and nozzle guide vanes, are segmented to allow radial movement caused by differential heating relative to a casing of the gas turbine engine. The differential heating may also influence tip clearance and stress. Thus, inter-component gaps (e.g., defined between adjacent seal segments) and positions (e.g., of the seal segments) may change over time. The inter-component gaps may require sealing to prevent a flow of a cooling air from an outboard side into a main gas path of the gas turbine engine.

Typically, opposing faces of adjacent components (e.g., the adjacent seal segments defining the inter-component gap) include slots to receive seal strips. The seal strips sit in the slots and may restrict the flow of the cooling air from the outboard side into the main gas path of the gas turbine engine. This may prevent loss of the cooling air and may improve an engine efficiency. As the components move, the strip seals may slide or tilt. A flow/leakage of the cooling air from the outboard side into the main gas path may be based on a cross-sectional area of a clearance between the strip seal and the slot. Based on this, a sealing solution may be to fit a thick strip seal in a thin slot to reduce the cross-sectional flow. However, this may not be the best sealing solution as the strip seals may not form an effective contact (i.e., the strip seal may contact a single face or a single point from the adjacent seal segments). This may negatively affect a sealing performance of the strip seal. Additionally, stiffness, tolerance, and manufacturing method may also affect a performance of the solution.

In some other cases, rod seals are used to restrict the flow of the cooling air from the outboard side into the main gas path of the gas turbine engine. However, integrating the rod seals with other seals (such as radial seals) may require machining of slots. Further, the rod seals may also have a significantly greater mass than other conventional seals and may damage downstream components, if released.

SUMMARY

In a first aspect, the present disclosure provides an intercomponent seal arrangement for a gas turbine engine having a principal rotational axis. The intercomponent seal arrangement includes a plurality of wall segments extending circumferentially and disposed adjacent to each other about the principal rotational axis of the gas turbine engine. Adjacent wall segments from the plurality of wall segments include opposing first and second end wall portions which define a gap therebetween. The gap includes a saddle portion which faces radially outwards. The saddle portion includes a first sealing face on the first end wall portion and a second sealing face on the second end wall portion. The intercomponent seal arrangement further includes an intercomponent seal located at least partially within the saddle portion and including at least a first contact point, a second contact point, and a third contact point radially inwards from the first and second contact points. The first contact point contacts the first sealing face along a length of the saddle portion. The second contact point contacts the second sealing face along the length of the saddle portion. The third contact point contacts one of the first and second sealing faces along the length of the saddle portion radially inwards from the first and second contact points.

The intercomponent seal arrangement of the present disclosure seeks to provide an improved sealing of the gap. Specifically, since the first contact point contacts the first sealing face along the length of the saddle portion, the second contact point contacts the second sealing face along the length of the saddle portion, and the third contact point contacts one of the first and second sealing faces along the length of the saddle portion, the intercomponent seal may make a good contact with the first and second sealing faces. This may significantly improve a sealing performance of the intercomponent seal arrangement. This is because even if a cooling air from an outboard side leaks from the first contact point and/or the second contact point towards a main gas path of the gas turbine engine, the cooling air may also have to negotiate the third contact point.

Further, the intercomponent seal may be able to conform to the first and second sealing faces. Therefore, the intercomponent seal may reduce a flow of the cooling air from the outboard side into the main gas path of the gas turbine engine in both aligned and misaligned positions which may be due to the movement of the adjacent wall segments.

Moreover, the intercomponent seal may offer increased resistance to thermal damage by having the first and second contact points further away from the gas path (thus being cooler).

In some embodiments, the first sealing face and the second sealing face are substantially planar. The first sealing face and the second sealing face may therefore be relatively cheaper, quick, and efficient to machine using conventional methods as opposed to strip seal grooves that may require costlier, more complex, and more time-consuming methods of manufacture. Further, the substantially planar first and second sealing faces may provide a good access for application of coatings. Furthermore, the first and second sealing faces that are substantially planar may provide an improved sealing performance.

In some embodiments, the first sealing face and the second sealing face define a slip angle therebetween, and the slip angle is less than or equal to 90 degrees. An angled exit defined by the first sealing face and the second sealing face may provide cooling benefits to the first sealing face and the second sealing face of the wall segments as the cooling air may adhere to the first sealing face and/or the second sealing face in case of a minor leakage of the cooling air from the outboard side of the gas turbine engine.

In some embodiments, a cross-sectional shape of the intercomponent seal normal to a longitudinal axis of the intercomponent seal is substantially triangular. The substantially triangular cross-sectional shape of the intercomponent seal may provide frictional benefits to further reduce the flow of the cooling air from the outboard side into the main gas path.

In some embodiments, the intercomponent seal is substantially hollow. Therefore, the intercomponent seal may have a reduced mass/geometry (e.g., compared to rod seals) and may not damage downstream components, if released. Further, a void defined by the hollow intercomponent seal may mix and cool any hot gas entering from the main gas path of the gas turbine engine.

In some embodiments, the intercomponent seal includes a first leg including the first contact point, a second leg including the second and third contact points, and a connecting edge connected to each of the first leg and the second leg proximal to the first and second contact points. In some embodiments, the first leg is shorter than the second leg. Any leakage flow of the cooling air down the first leg may have to turn a corner (i.e., a torturous path). The torturous path may further provide a resistance to the flow of the cooling air into the main gas path.

In some embodiments, the first leg and the second leg are spaced apart and not joined to each other, such that the first leg and the second leg define an opening therebetween. The opening may reduce a torsional stiffness of the intercomponent seal which may further allow a better conformance of the intercomponent seal in the saddle portion over the length of the saddle portion.

In some embodiments, the connecting edge defines a plurality of cooling through-holes. The plurality of cooling through-holes may allow passage of the cooling air towards the third contact point to increase resistance of the intercomponent seal to the thermal damage. Specifically, the plurality of cooling through-holes in the connecting edge may impinge the cooling air onto the second leg including the third contact point. In some cases, the plurality of cooling through-holes may be drilled in the connecting edge.

In some embodiments, the second leg defines a plurality of cooling through-holes. In some cases, the wall segments may have a specific cooling flow requirement and the plurality of cooling through-holes defined in the second leg may act as controlling orifices. For example, when the wall segments are made of Ceramic Matrix Composite (CMC) materials, they may not include internal flow passages to provide cooling. Thus, the plurality of cooling through-holes defined in the second leg may provide a desired cooling to the wall segments.

In some embodiments, the first leg and the second leg define a seal angle therebetween. In some embodiments, the seal angle is greater than or equal to the slip angle. The seal angle being greater than or equal to the slip angle may bias the intercomponent seal towards the first and second contact points. This may ensure and promote contact of the intercomponent seal with the first and second sealing faces in both aligned and misaligned positions.

In some embodiments, at least one of the first leg, the second leg, and the connecting edge is substantially planar. The substantially planar first and second legs may be easy to machine to have a high quality surface finish which may further enhance the sealing performance of the intercomponent seal. Further, the substantially planar connecting edge may provide an improved interface with radial seals and may reduce axial gaps.

In some embodiments, at least one of the first and second sealing faces includes an outer coating. The outer coating may reduce wear, heat transfer, and/or chemical interaction between the first and second end wall portions and the intercomponent seal. Further, a smooth outer coating may further improve the sealing performance of the intercomponent seal.

In some embodiments, the intercomponent seal arrangement includes a pair of end caps connected to respective opposing ends of the intercomponent seal. The pair of end caps connected to respective opposing ends of the intercomponent seal may prevent an axial flow of the hot gas from the main gas path through the intercomponent seal.

In some embodiments, a gas turbine engine includes the intercomponent seal arrangement.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
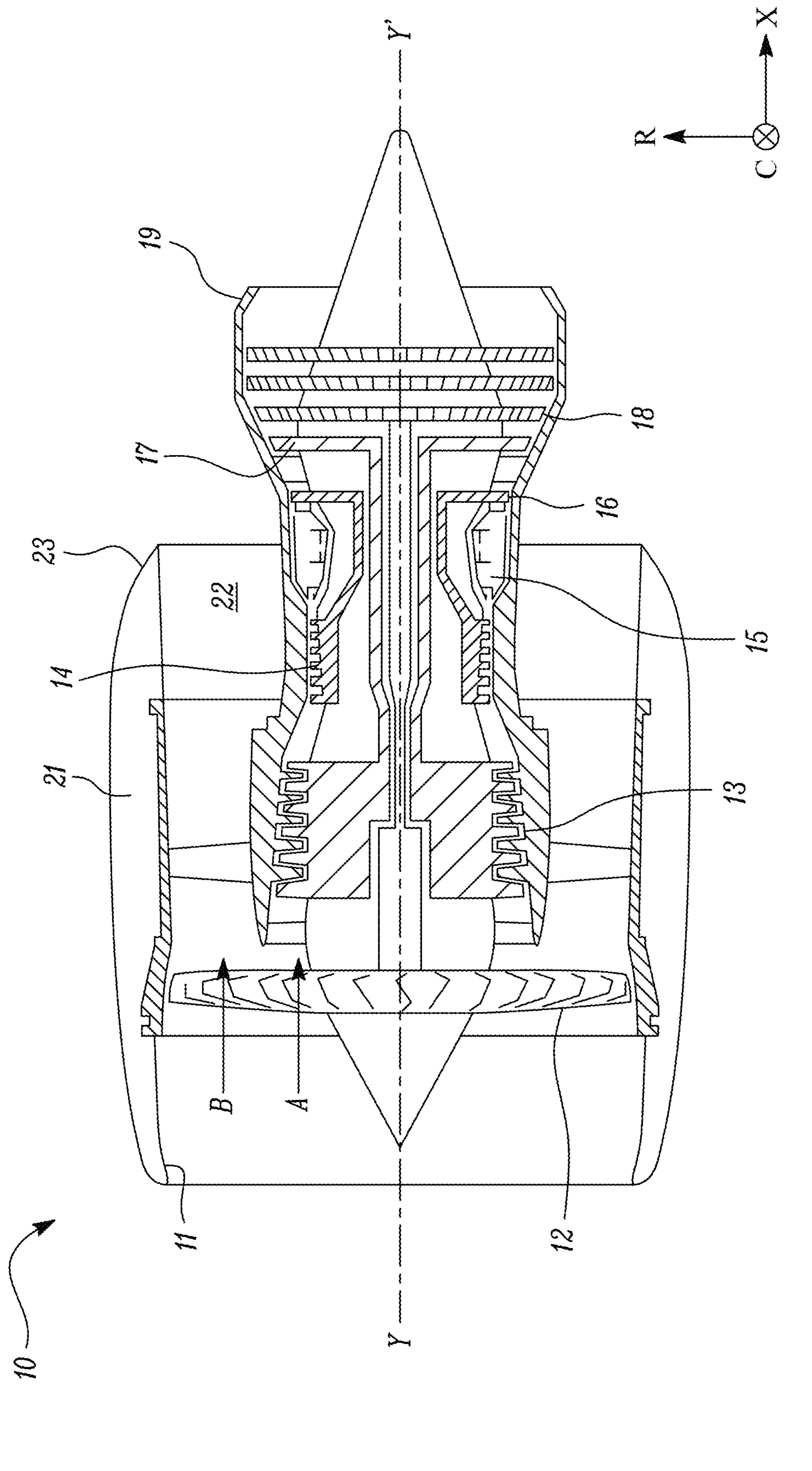
FIG. 1 shows a streamwise sectional view of a gas turbine engine.

FIG. 1 shows a streamwise sectional view of a gas turbine engine 10. The gas turbine engine generally has a principal and rotational axis Y-Y'. The gas turbine engine 10 includes an air intake 11, a propulsive fan 12, an intermediate pressure compressor 13, a high-pressure compressor 14, combustion equipment 15, a high-pressure turbine 16, an intermediate pressure turbine 17, a low-pressure turbine 18, a core engine exhaust nozzle 19. The gas turbine engine 10 further includes a nacelle 21 that generally surrounds the gas turbine engine and defines the intake 11, a bypass duct 22 and a bypass exhaust nozzle 23.

The gas turbine engine 10 works in a conventional manner so that air entering the intake 11 is accelerated by the fan 12 to produce two air flows. Specifically, the fan 12 produces a first air flow A that flows into the intermediate pressure compressor 13 and a second air flow B which passes through the bypass duct 22 to provide propulsive thrust. The intermediate pressure compressor 13 compresses the air flow A directed into it before delivering that air to the high-pressure compressor 14 where further compression takes place.

Furthermore, the compressed air exhausted from the high-pressure compressor 14 is directed into the combustion equipment 15 where it is mixed with fuel and the mixture is combusted. The resultant hot combustion products then expand through, and thereby drive the high, intermediate, and low-pressure turbines 16, 17, 18 before being exhausted through the nozzle 19 to provide additional propulsive thrust. The high, intermediate, and low-pressure turbines 16, 17, 18 respectively drive the high, intermediate pressure compressors 14, 13 and the fan 12 by suitable interconnecting shafts.

The geometry of the gas turbine engine 10, and components thereof, is defined by a conventional axis system, including an axial direction X (which is aligned with the rotational axis Y-Y'), a radial direction R (in the bottom-to-top direction in FIG. 1), and a circumferential direction C (perpendicular to the page in the FIG. 1 view). The axial, radial and circumferential directions X, R, C are mutually perpendicular. Further, inboard and outboard sides are defined in relation to the rotational axis Y-Y' of rotation of the gas turbine engine 10 and upstream and downstream ends are defined with reference to a main gas path flow.

Figure 2:
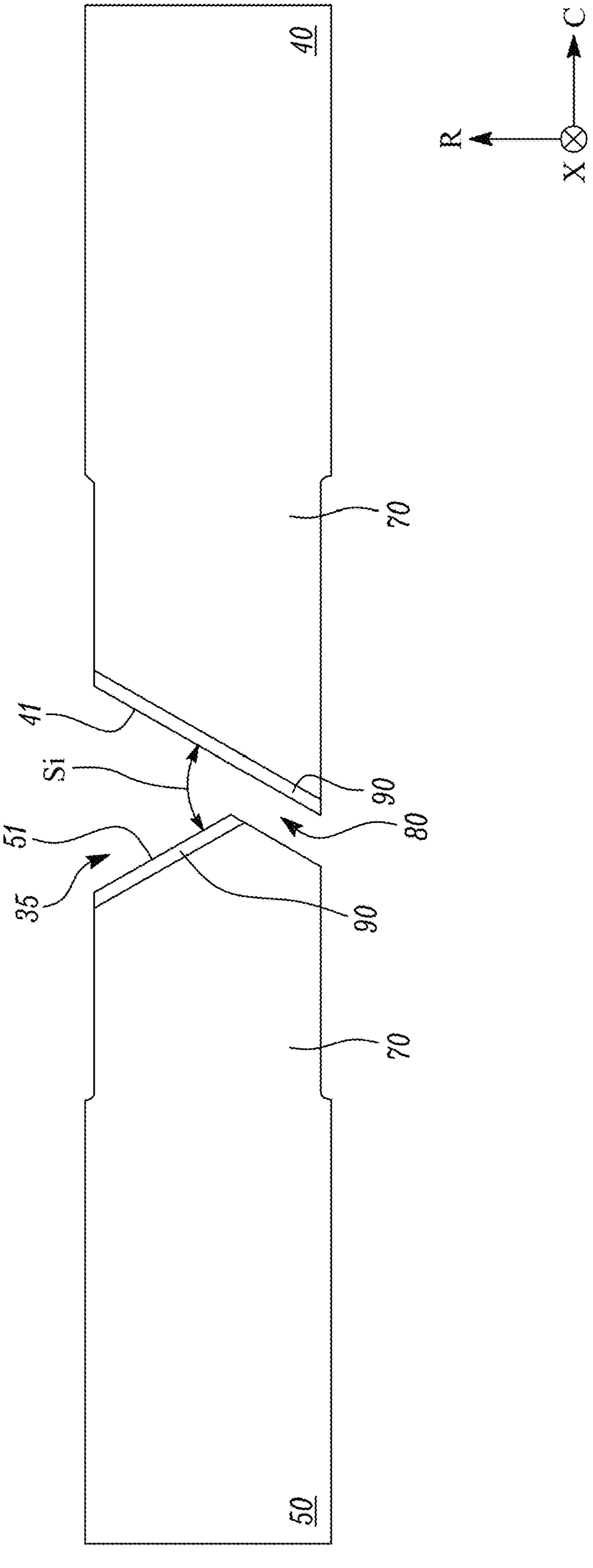
FIG. 2 shows a schematic sectional view of two adjacent wall segments from a plurality of wall segments.

FIG. 2 shows a schematic sectional view of two adjacent wall segments 70 from a plurality of wall segments 70, according to an embodiment of the present disclosure.

The plurality of wall segments 70 extends circumferentially (i.e., along the circumferential direction C) and is disposed adjacent to each other about the principal rotational axis Y-Y' (shown in FIG. 1) of the gas turbine engine 10 (shown in FIG. 1). Specifically, the two adjacent wall segments 70 shown in FIG. 2 are two from a similar arcuate plurality of wall segments 70 which form an annular outer wall of the main gas path (i.e., through which the first air flow A shown in FIG. 1 flows) in a turbine section of the gas turbine engine 10 shown in FIG. 1. The turbine section may include one or more of the high-pressure turbine 16, the intermediate pressure turbine 17, the low-pressure turbine 18 shown in FIG. 1. In other words, the plurality of wall segments 70 bounds and defines the main gas path.

In some embodiments, the plurality of wall segments 70 may be manufactured using materials such as, Ceramic Matrix Composite (CMC). CMC materials offer superior temperature and creep resistant properties for gas turbine engines (e.g., the gas turbine engine 10 shown in FIG. 1) and have a considerably lower density than their superalloy counterparts making them ideal for aeroengines. Further, because they have a higher temperature tolerance, the CMC materials require less cooling which acts to increase specific fuel consumption further. The CMC materials generally consist of ceramic fibres embedded with a ceramic body. There are different materials available for fibres and body. In some embodiments, the CMC materials include silicon carbide fibres within a body of silicon carbide, so-called SiC/SiC, and aluminium oxide fibres within an aluminium oxide body, which is referred simply as an oxide CMC. In some other embodiments, the plurality of wall segments 70 may be manufactured using any suitable material(s), as per desired application attributes. For example, the wall segments 70 may be manufactured using cast metal.

The adjacent wall segments 70 from the plurality of wall segments 70 include opposing first and second end wall portions 40, 50 which define a gap 80 therebetween. In some embodiments, the gap 80 extends axially from the upstream end to the downstream end of the plurality of wall segments 70, and radially from the inboard side to the outboard side of the plurality of wall segments 70. The gap 80 may extend from a wider portion at the outboard side and narrows along its radial length towards the inboard side (i.e., the gas path side) so as to provide a generally convergent arrangement. As shown in FIG. 2, in some embodiments, the gap 80 may be Y or funnel shaped.

The gap 80 may allow relative movement between the wall segments 70 when in use. Specifically, the gap 80 may allow each adjacent wall segments 70 to move independently of each other, thereby allowing the annular outer wall to expand and contract in use. As will be appreciated, the gap 80 is required to be sealed to prevent an egress of hot gas from the main gas path into the surrounding structure, and to avoid excessive amounts of a leakage air flow (e.g., a flow of a cooling air from the outboard side of the gas turbine engine 10 shown in FIG. 1) passing into the main gas path. Furthermore, uniformity and circumferential extent of the gap 80 may vary during use with differential thermal expansion and relative movement.

The gap 80 includes a saddle portion 35 which faces radially outwards (i.e., along the radial direction R). Specifically, the wider portion of the gap 80 includes the saddle portion 35 which faces radially outwards.

The saddle portion 35 includes a first sealing face 41 on the first end wall portion 40 and a second sealing face 51 on the second end wall portion 50. In some embodiments, the first sealing face 41 and the second sealing face 51 are substantially planar. In some embodiments, the first sealing face 41 and the second sealing face 51 have substantially smooth surface finish. The first sealing face 41 and the second sealing face 51 may therefore be relatively cheaper, quick, and efficient to machine using conventional methods as opposed to strip seal grooves that may be costlier, more complex, and more time-consuming methods of manufacture. Further, the first and second sealing faces 41, 51 that are substantially planar may provide an improved sealing performance.

Furthermore, the substantially planar first and second sealing faces 41, 51 may a have good access for application of coatings. In some embodiments, at least one of the first and second sealing faces 41, 51 includes an outer coating 90. The outer coating 90 may reduce thermal transfer and/or wear. The outer coating 90 may be an Environmental Barrier Coating (EBC), which helps to isolate the at least one of the first and second sealing faces 41, 51 from water and protect it from oxygen erosion, or a thermal barrier coating which may help to protect the at least one of the first and second sealing faces 41, 51 from the operating temperatures. In the illustrated example of FIG. 2, each of the first and second sealing faces 41, 51 includes the outer coating 90.

In some embodiments, the first sealing face 41 and the second sealing face 51 define a slip angle Si therebetween. Furthermore, in some embodiments, the slip angle Si is less than or equal to 90 degrees. An angled exit defined by the first sealing face 41 and the second sealing face 51 may provide cooling benefits to the first sealing face 41 and the second sealing face 51 of the wall segments 70 as the cooling air may adhere to the first sealing face 41 and/or the second sealing face 51 in case of a minor leakage of the cooling air from the outboard side of the gas turbine engine 10 shown in FIG. 1.

Figure 3:
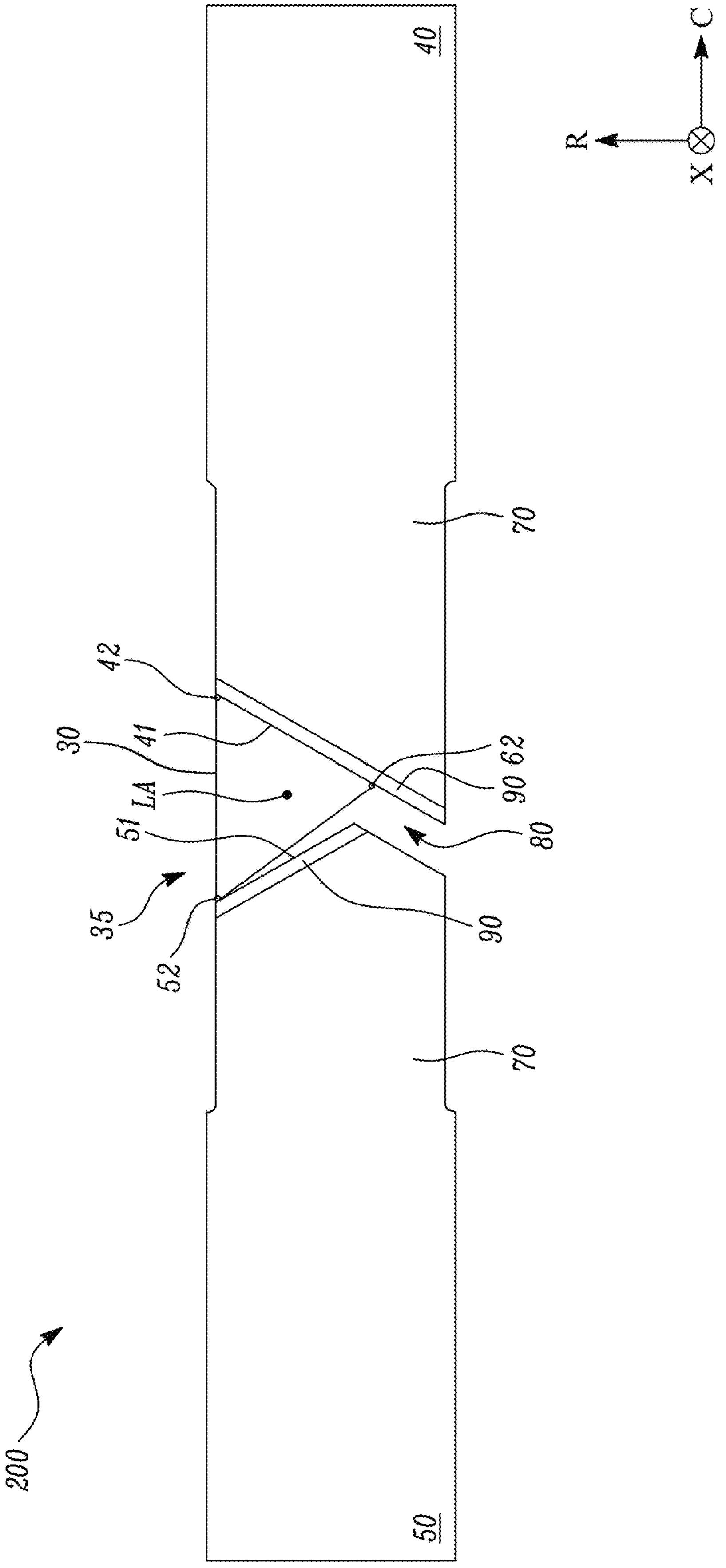
FIG. 3 shows a schematic sectional view of an intercomponent seal arrangement.

FIG. 3 shows a schematic sectional view of an intercomponent seal arrangement 200, according to an embodiment of the present disclosure. In some embodiments, the gas turbine engine 10 (shown in FIG. 1) includes the intercomponent seal arrangement 200.

The intercomponent seal arrangement 200 includes the plurality of wall segments 70 extending circumferentially and disposed adjacent to each other about the principal rotational axis Y-Y' of the gas turbine engine 10 (shown in FIG. 1). As discussed above, the plurality of wall segments 70 includes the opposing first and second end wall portions 40, 50, which define the gap 80 therebetween.

The intercomponent seal arrangement 200 further includes an intercomponent seal 30 located at least partially within the saddle portion 35 (shown in FIG. 2). The intercomponent seal 30 may be made from any suitable material. In some embodiments, the intercomponent seal 30 may include nickel or cobalt alloys, or a monolithic or fibre-based ceramic. The intercomponent seal 30 may be manufactured using various fabrication processes, such as casting, machining (e.g., electrical discharge machining (EDM)), or a sheet metal process. The sheet metal process may be one of the most cost-effective ways to manufacture the intercomponent seal 30.

The intercomponent seal 30 includes at least a first contact point 42, a second contact point 52, and a third contact point 62. The third contact point 62 is radially inwards from the first and second contact points 42, 52. In some embodiments, the intercomponent seal 30 extends from the upstream end to the downstream end of the plurality of wall segments 70 either partially or entirely. In other words, the intercomponent seal 30 generally extends along a length of the saddle portion 35.

The intercomponent seal 30 may restrict a flow across radial extent (i.e., along the radial direction R) of the wall segments 70. Specifically, the intercomponent seal 30 may restrict the flow of the cooling air from the outboard side into the main gas path. The first contact point 42 contacts the first sealing face 41 along the length of the saddle portion 35, the second contact point 52 contacts the second sealing face 51 along the length of the saddle portion 35, and, the third contact point 62 contacts one of the first and second sealing faces 41, 51 along the length of the saddle portion 35 radially inwards from the first and second contact points 42, 52. In the illustrated embodiment of FIG. 3, the third contact point 62 contacts the first sealing face 41 along the length of the saddle portion 35. As discussed above, the third contact point 62 is radially inwards from the first and second contact points 42, 52.

The intercomponent seal arrangement 200 may provide an improved sealing of the gap 80. Specifically, since the first contact point 42 contacts the first sealing face 41 along the length of the saddle portion 35, the second contact point 52 contacts the second sealing face 51 along the length of the saddle portion, and the third contact point 62 contacts one of the first and second sealing faces 41, 51 along the length of the saddle portion, the intercomponent seal 30 may make a good contact with the first and second sealing faces 41, 51. This may significantly improve a sealing performance of the intercomponent seal arrangement 200. This is because even if the cooling air from the outboard side leaks from the first contact point 42 and/or the second contact point 52 towards the main gas path of the gas turbine engine 10, the cooling air may also have to negotiate the third contact point 62.

Further, the intercomponent seal 30 may be able to conform to the first and second sealing faces 41, 51. Therefore, the intercomponent seal 30 may reduce the flow of the cooling air from the outboard side into the main gas path of the gas turbine engine 10 in both aligned and misaligned positions which may be due to the movement of the adjacent wall segments 70.

Moreover, the intercomponent seal 30 may offer increased resistance to thermal damage by having the first and second contact points 42, 52 further away from the gas path (thus being cooler).

In some embodiments, the cross-sectional shape of the intercomponent seal 30 normal to a longitudinal axis LA of the intercomponent seal 30 is substantially triangular. In other words, the intercomponent seal 30 has a substantially triangular cross-section. The substantially triangular cross-sectional shape of the intercomponent seal 30 may provide frictional benefits to further reduce the flow of the cooling air from the outboard side into the main gas path. In the illustrated embodiment of FIG. 3, the longitudinal axis LA is substantially along the axial direction X.

Figure 4:
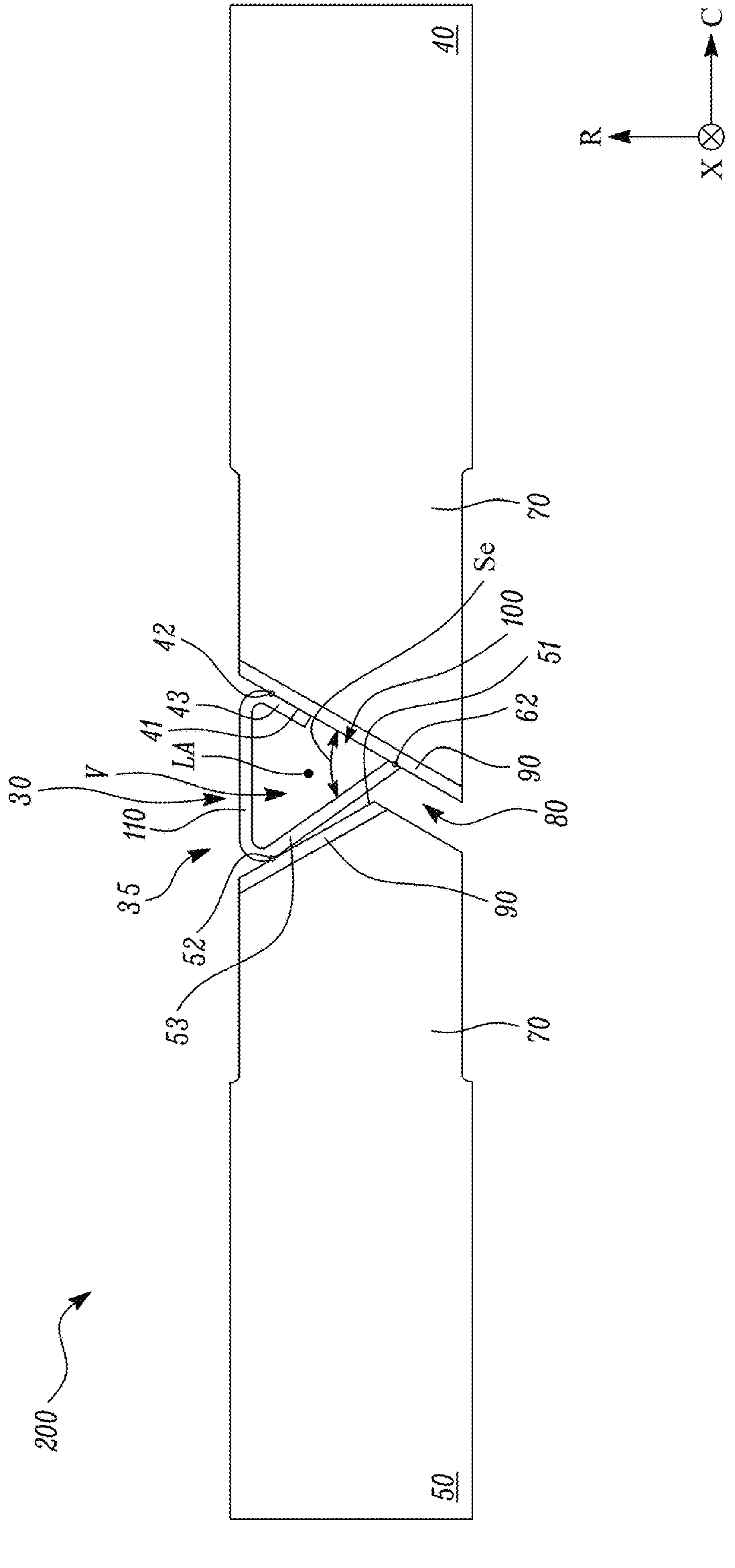
FIG. 4 shows a schematic sectional view of the intercomponent seal arrangement, according to another embodiment of the present disclosure.

FIG. 4 shows a schematic sectional view of the intercomponent seal arrangement 200, according to another embodiment of the present disclosure.

The intercomponent seal arrangement 200 shown in FIG. 4 is substantially similar to the intercomponent seal arrangement 200 shown in FIG. 3. However, in the illustrated embodiment of FIG. 4, the intercomponent seal 30 is substantially hollow. Therefore, the intercomponent seal 30 of FIG. 4 may have a reduced mass/geometry (e.g., compared to rod seals) and may not damage downstream components, if released. Further, a void V defined at least partially by the hollow intercomponent seal 30 may mix and cool any hot gas entering from the main gas path of the gas turbine engine 10 shown in FIG. 1.

Further, in the illustrated embodiment of FIG. 4, the intercomponent seal 30 includes a first leg 43 including the first contact point 42 and a second leg 53 including the second and third contact points 52, 62.

In some embodiments, the intercomponent seal 30 further includes a connecting edge 110 connected to each of the first leg 43 and the second leg 53 proximal to the first and second contact points 42, 52.

In some embodiments, at least one of the first leg 43, the second leg 53, and the connecting edge 110 is substantially planar. The substantially planar first and second legs 43, 53 may be easy to machine to have a high quality surface finish which may further enhance the sealing performance of the intercomponent seal 30. Further, the substantially planar connecting edge 63 may provide an improved interface with radial seals and may reduce axial gaps.

In some embodiments, the first leg 43 is shorter than the second leg 53. Any leakage flow of the cooling air down the first leg 43 may have to turn a corner (i.e., a torturous path). The torturous path may further provide a resistance to the flow of the cooling air into the main gas path.

Furthermore, in some embodiments, the first leg 43 and the second leg 53 are spaced apart and not joined to each other, such that the first leg 43 and the second leg 53 define an opening 100 therebetween. The opening 100 may reduce a torsional stiffness of the intercomponent seal 30 which may further allow a better conformance of the intercomponent seal 30 in the saddle portion 35 over the length of the saddle portion 35.

In some embodiments, the first and the second legs 43, 53 define a seal angle Se therebetween. Furthermore, in some embodiments, the seal angle Se is greater than or equal to the slip angle Si (shown in FIG. 2). The seal angle Se being greater than or equal to the slip angle Si may bias the intercomponent seal 30 towards the first and second contact points 42, 52. This may ensure and promote contact of the intercomponent seal 30 with the first and second sealing faces 41, 51 in the both aligned and misaligned positions.

Figure 5:
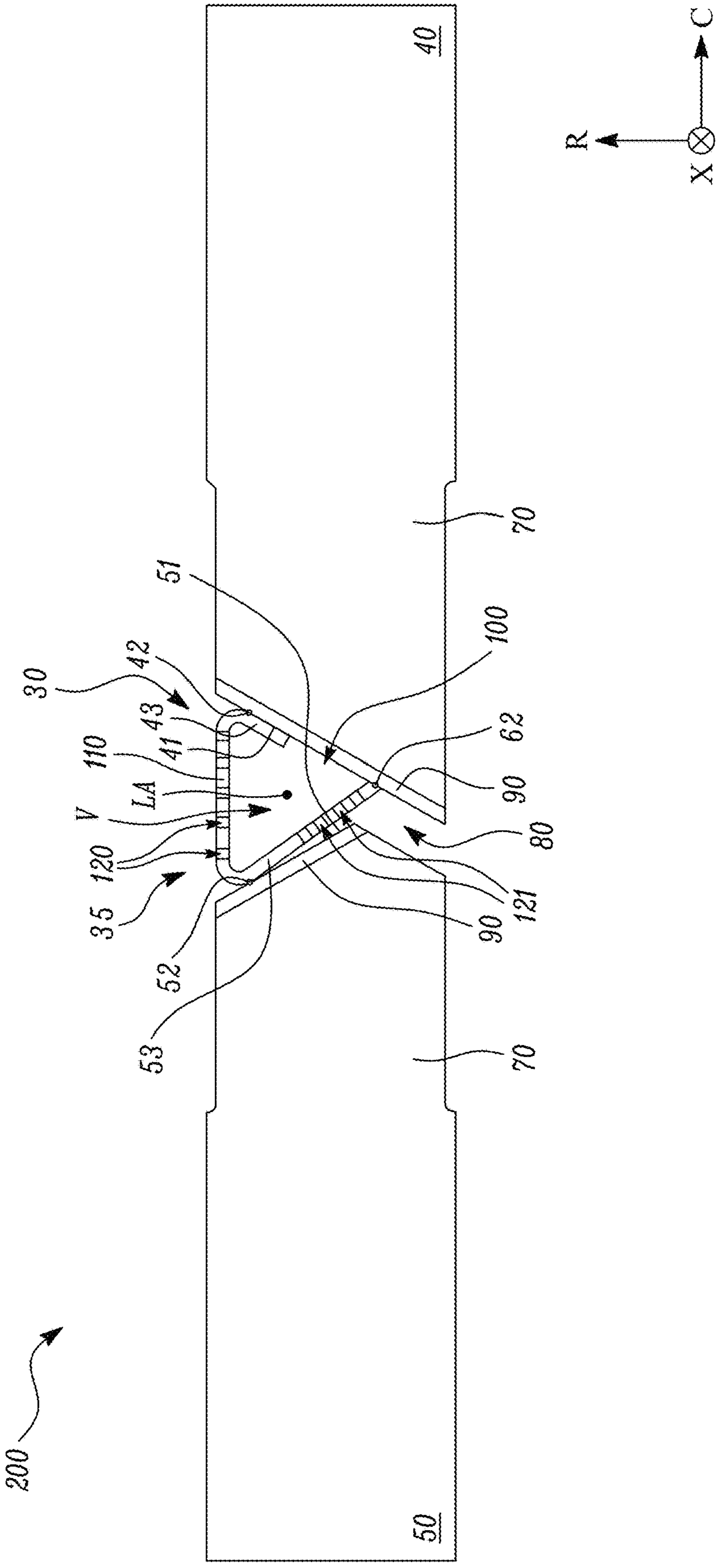
FIG. 5 shows a schematic sectional view of the intercomponent seal arrangement, according to yet another embodiment of the present disclosure.

FIG. 5 shows a schematic sectional view of the intercomponent seal arrangement 200, according to another embodiment of the present disclosure.

The intercomponent seal arrangement 200 shown in FIG. 5 is substantially similar to the intercomponent seal arrangement 200 shown in FIG. 4. However, in the illustrated embodiment of FIG. 5, the connecting edge 110 defines a plurality of cooling through-holes 120. The plurality of cooling through-holes 120 may allow passage of the cooling air towards the third contact point 62 to increase resistance of the intercomponent seal 30 to the thermal damage. Specifically, the plurality of cooling through-holes 120 in the connecting edge 110 may impinge the cooling air onto the second leg 53 including the third contact point 62. In some cases, the plurality of cooling through-holes 120 may be drilled in the connecting edge 110.

In some embodiments, the plurality of cooling through-holes 120 may be distributed evenly along an axial length (i.e., along the axial direction) of the connecting edge 110 of the intercomponent seal 30. In some embodiments, each cooling through-hole 120 may have a similar sectional flow area. However, the cooling through-holes 120 may be adapted to suit the pressure and cooling requirements which may vary along the main gas path of the plurality of wall segments 70 according to the gas path conditions. Thus, the number and flow area of the cooling through-holes 120 may differ along the axial length of the connecting edge 110 of the intercomponent seal 30.

Furthermore, in some embodiments, the second leg 53 defines a plurality of cooling through-holes 121. In some cases, the wall segments 70 may have a specific cooling flow requirement and the plurality of cooling through-holes 121 defined in the second leg 53 may act as controlling orifices. For example, when the wall segments 70 are made of the CMC materials, they may not include internal flow passages to provide cooling. Thus, the plurality of cooling through-holes 121 defined in the second leg 53 may provide a desired cooling to the wall segments 70.

Figure 6A:
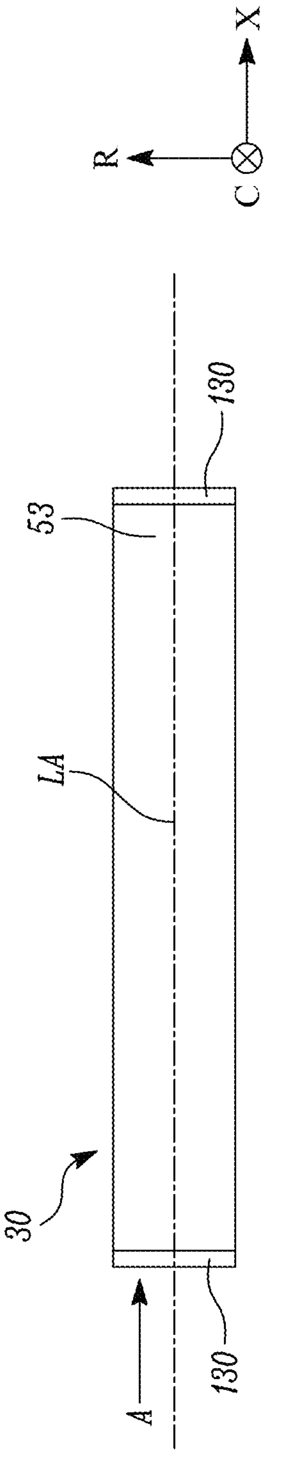
FIG. 6A shows a schematic sectional view of an intercomponent seal including a pair of end caps, according to an embodiment of the present disclosure.

FIG. 6A shows a schematic sectional view of the intercomponent seal 30 including a pair of end caps 130, according to an embodiment of the present disclosure. Specifically, FIG. 6A is a schematic cross-sectional view taken along the longitudinal axis LA of the intercomponent seal 30.

In the illustrated example of FIG. 6A, the pair of end caps 130 is connected to respective opposing ends of the intercomponent seal 30. The pair of end caps 130 connected to respective opposing ends of the intercomponent seal 30 may prevent an axial flow of the hot gas from the main gas path through the intercomponent seal 30. Specifically, the pair of end caps 130 may prevent the flow of the first air flow A (shown in FIG. 1) through the intercomponent seal 30.

Figure 6B:
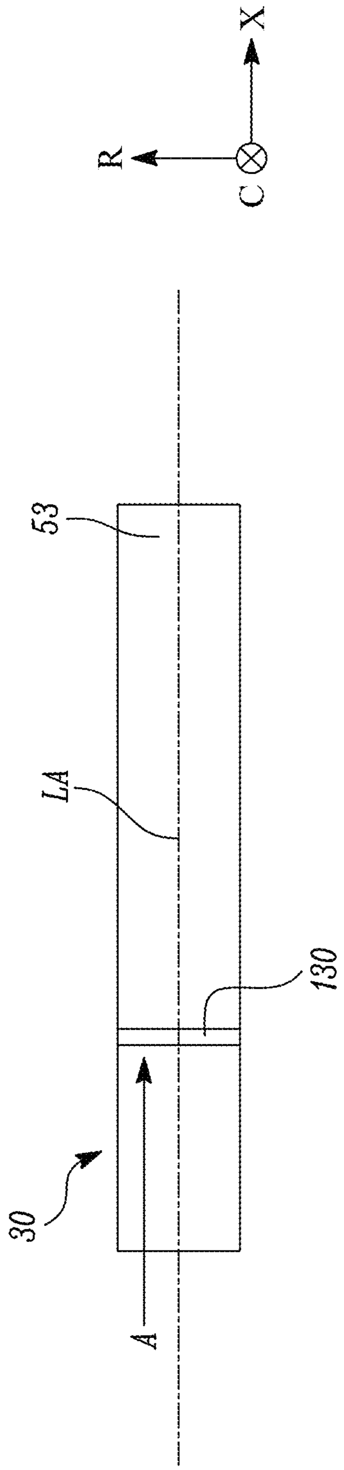
FIG. 6B shows a schematic sectional view of the intercomponent seal including a single end cap, according to an embodiment of the present disclosure.

FIG. 6B shows a schematic sectional view of the intercomponent seal 30 including a single end cap 130, according to another embodiment of the present disclosure.

In the illustrated example of FIG. 6B, the single end cap 130 is located proximal to one end of the intercomponent seal 30. However, in some other embodiments, the single end cap 130 may be located at a middle of the opposing ends of the intercomponent seal 30. The single end cap 130 may prevent the axial flow of the hot gas from the main gas path through the intercomponent seal 30. Specifically, the single end cap 130 may prevent the flow of the first air flow A (shown in FIG. 1) through the intercomponent seal 30.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. An intercomponent seal arrangement for a gas turbine engine having a principal rotational axis, the intercomponent seal arrangement comprising:

a plurality of wall segments extending circumferentially and disposed adjacent to each other about the principal rotational axis of the gas turbine engine, adjacent wall segments from the plurality of wall segments comprising opposing first and second end wall portions which define a gap therebetween, wherein the gap comprises a saddle portion which faces radially outwards and comprises a first sealing face on the first end wall portion and a second sealing face on the second end wall portion;

an intercomponent seal located at least partially within the saddle portion and comprising at least a first contact point, a second contact point, and a third contact point radially inwards from the first and second contact points, wherein the first contact point contacts the first sealing face along a length of the saddle portion, the second contact point contacts the second sealing face along the length of the saddle portion, and the third contact point contacts one of the first and second sealing faces along the length of the saddle portion radially inwards from the first and second contact points;

wherein a cross-sectional shape of the intercomponent seal normal to a longitudinal axis of the intercomponent seal is substantially triangular; and wherein the first contact point, the second contact point, and the third contact point are located at a first corner, a second corner, and a third corner of the intercomponent seal respectively.

2. The intercomponent seal arrangement of claim 1, wherein the first sealing face and the second sealing face are substantially planar.

3. The intercomponent seal arrangement of claim 2, wherein the first sealing face and the second sealing face define a slip angle therebetween, and wherein the slip angle is less than or equal to 90 degrees.

4. The intercomponent seal arrangement of claim 1, wherein the intercomponent seal is substantially hollow.

5. The intercomponent seal arrangement of claim 1, wherein the intercomponent seal comprises a first leg comprising the first contact point, a second leg comprising the second and third contact points, and a connecting edge connected to each of the first leg and the second leg proximal to the first and second contact points, and wherein the first leg is shorter than the second leg.

6. The intercomponent seal arrangement of claim 5, wherein the first leg and the second leg are spaced apart and not joined to each other, such that the first leg and the second leg define an opening therebetween.

7. The intercomponent seal arrangement of claim 5, wherein the connecting edge defines a plurality of cooling through-holes.

8. The intercomponent seal arrangement of claim 5, wherein the second leg defines a plurality of cooling through-holes.

9. The intercomponent seal arrangement of claim 5, wherein the first leg and the second leg define a seal angle therebetween, and wherein the seal angle is greater than or equal to the slip angle.

10. The intercomponent seal arrangement of claim 5, wherein at least one of the first leg, the second leg, and the connecting edge is substantially planar.

11. The intercomponent seal arrangement of claim 1, wherein at least one of the first and second sealing faces comprises an outer coating.

12. The intercomponent seal arrangement of claim 1, further comprising a pair of end caps connected to respective opposing ends of the intercomponent seal.

13. A gas turbine engine including the intercomponent seal arrangement of claim 1.

14. The intercomponent seal arrangement of claim 1, wherein a portion of the gap that is radially inward of the saddle portion extends axially from an upstream end to a downstream end of the plurality of wall segments, and extends radially from an inboard side of the plurality of wall segments to the saddle portion.

* * * * *